United States Patent
Ashok et al.

(10) Patent No.: US 9,053,446 B2
(45) Date of Patent: Jun. 9, 2015

(54) DYNAMICALLY QUANTIFYING THE DEMAND OF EACH SOFTWARE COMPONENT OF EACH SOFTWARE STACK DEPLOYED IN THE CLOUD ENVIRONMENT

(71) Applicant: International Business Machines Corporation, Armonk, NY (US)

(72) Inventors: Rohith K. Ashok, Apex, NC (US); Steven D. Ims, Apex, NC (US); James K. Kochuba, Raleigh, NC (US); Aaron J. Quirk, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 13/685,898

(22) Filed: Nov. 27, 2012

(65) Prior Publication Data
US 2014/0149421 A1     May 29, 2014

(51) Int. Cl.
*G06F 17/30* (2006.01)
*G06Q 10/06* (2012.01)
*G06F 9/50* (2006.01)

(52) U.S. Cl.
CPC .......... *G06Q 10/0631* (2013.01); *G06F 9/5072* (2013.01); *G06F 2209/5019* (2013.01)

(58) Field of Classification Search
CPC ................................................ G06F 17/30144
See application file for complete search history.

(56) References Cited

U.S. PATENT DOCUMENTS

| | | | |
|---|---|---|---|
| 8,463,633 B2 * | 6/2013 | Jung et al. | 705/7.11 |
| 2011/0295999 A1 | 12/2011 | Ferris et al. | |
| 2012/0131577 A1 | 5/2012 | Arcese et al. | |
| 2012/0304248 A1 * | 11/2012 | Watts et al. | 726/1 |
| 2013/0091508 A1 * | 4/2013 | Srinivasan | 718/104 |
| 2014/0013315 A1 * | 1/2014 | Genevski et al. | 717/170 |
| 2014/0040656 A1 * | 2/2014 | Ho et al. | 714/3 |

OTHER PUBLICATIONS

Mell et al., "The NIST Definition of Cloud Computing," Special Publication 800-145, Sep. 2011.

* cited by examiner

*Primary Examiner* — Khanh Pham
(74) *Attorney, Agent, or Firm* — Robert A. Voigt, Jr.; Winstead, P.C.

(57) ABSTRACT

A method, system and computer program product for dynamically quantifying a demand for the software components deployed in a cloud environment. An administrative server generates a table mapping the software levels of the software components of the deployed software stacks with the number of instances of the deployed software stacks tracked over a period of time. The depth weight based on subtracting a depth index (zero-based) from a depth size is calculated for each software component, where a depth index refers to the software level of the software component in question and a depth size refers to the number of software levels for the software stack bearing the software component in question. A metric used in quantifying the demand for the software component ("popularity index") is then determined for each software component based on the number of deployed instances and the depth weight for that software component.

20 Claims, 8 Drawing Sheets

Deployment History — 700

| Operating system | Middleware | Application Binaries | Number of Deployed Instances |
|---|---|---|---|
| Red Hat Enterprise Linux® 6.1 | WebSphere® Application Server 8.0.0.1 | ClientWebApp1.ear | 10 |
| Red Hat Enterprise Linux® 6.1 | WebSphere® Application Server 7.0.0.19 | ClientWebApp2.ear | 7 |
| AIX® 6.10.3 | DB2® 9.7.1 | CustomerDB.ddl | 3 |

| Software Component | Rank |
|---|---|
| Red Hat Enterprise Linux® 6.1 | 17 |
| WebSphere® Application Server 8.0.0.1 | 10 |
| ClientWebApp1.ear | 10 |
| WebSphere® Application Server 7.0.0.19 | 7 |
| ClientWebApp2.ear | 7 |
| AIX® 6.10.3 | 3 |
| DB2® 9.7.1 | 3 |
| CustomerDB.ddl | 3 |

FIG. 8

| Software Component | Rank | Weight | Popularity Index |
|---|---|---|---|
| Red Hat Enterprise Linux® 6.1 | 17 | 3 | 51 |
| WebSphere® Application Server 8.0.0.1 | 10 | 2 | 20 |
| ClientWebApp1.ear | 10 | 1 | 10 |
| WebSphere® Application Server 7.0.0.19 | 7 | 2 | 14 |
| ClientWebApp2.ear | 7 | 1 | 7 |
| AIX® 6.1.0.3 | 3 | 3 | 9 |
| DB2® 9.7.1 | 3 | 2 | 6 |
| CustomerDB.ddl | 3 | 1 | 3 |

FIG. 9

DYNAMICALLY QUANTIFYING THE DEMAND OF EACH SOFTWARE COMPONENT OF EACH SOFTWARE STACK DEPLOYED IN THE CLOUD ENVIRONMENT

TECHNICAL FIELD

The present invention relates to cloud computing, and more particularly to dynamically quantifying the demand of each software component of each software stack deployed in the cloud environment.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

A "software stack" is a special type of software definition that is used identify groups of software (e.g., operating system, middleware applications, user supplied applications) to install at the same time and in a specific sequence on target systems. A software stack can include installable files and software definitions for software products, software patches, and other software stacks. Software stacks serve several purposes, such as consistently installing the same software in the correct order and with the same configuration on managed systems. Also, software stacks can be added to computer templates so that the managed systems that are not compliant with the software stack can be easily identified. Furthermore, software stacks can be installed on individual systems or added to computer templates for automatic installation on provisioned servers.

Software stacks can be deployed, such as in the cloud environment, using a list of software definitions or an image. Multiple instances of each these software stacks may be deployed in the cloud environment, including the various software components (e.g., operating system, middleware and other applications) that comprise the software stacks. Some of these software components (e.g., Red Hat Enterprise Linux® 6.1 operating system) may be used in multiple software stacks.

If the cloud administrator knew which software components in the deployed software stacks were most popular (i.e., have the highest demand) at a given moment in time, then the cloud administrator may be able to make those resources more readily available at that time thereby more efficiently using the resources of the cloud environment. However, it is currently very difficult for the cloud administrator to quantify which software components of the software stacks deployed in the cloud environment are in the highest demand since the number of deployed software stacks is large and users are constantly adding and removing workloads from the cloud environment.

As a result, cloud administrators cannot currently allocate resources of the cloud environment efficiently to meet changes in user demands as priorities change.

BRIEF SUMMARY

In one embodiment of the present invention, a method for dynamically quantifying a demand for software components deployed in a cloud environment comprises tracking a number of instances that each of a plurality of software stacks is deployed in the cloud environment over a period of time. The method further comprises generating a table mapping software levels of software components for each of the plurality of software stacks to the tracked number of instances that each of the plurality of software stacks is deployed in the cloud environment over the period of time. Additionally, the method comprises identifying a number of deployed instances for each of the software components based on the table. Furthermore, the method comprises calculating a weight for each of the software components. In addition, the method comprises determining, by processor, a popularity index for each of the software components based on the number of deployed instances and the weight.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for dynamically quantifying a demand for the software components deployed in a cloud environment. In one embodiment of the present invention, an administrative server tracks the number of instances that the software stacks have been deployed in the cloud environment over a period of time. The administrative server generates a table mapping the software levels of the software components of the deployed software stacks with the number of tracked instances of the deployed software stacks. The total number of deployed instances for each software component (across the multiple software stacks deployed in the cloud environment) is identified based on the table. The depth weight based on subtracting a depth index (zero-based) from a depth size is calculated for each software component, where a depth index refers to the particular software level of the software component in question and a depth size refers to the number of software levels for the software stack bearing the software component in question. A metric used in quantifying the demand for the software component ("popularity index") is then determined for each software component based on the number of deployed instances and the depth weight for that software component, where the popularity index is equal to the number of deployed instances multiplied by the depth weight. By developing a metric (popularity index) to quantify the demand of a software component, the cloud administrator will be better able to more efficiently allocate the resources of the cloud environment.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Figure 1:
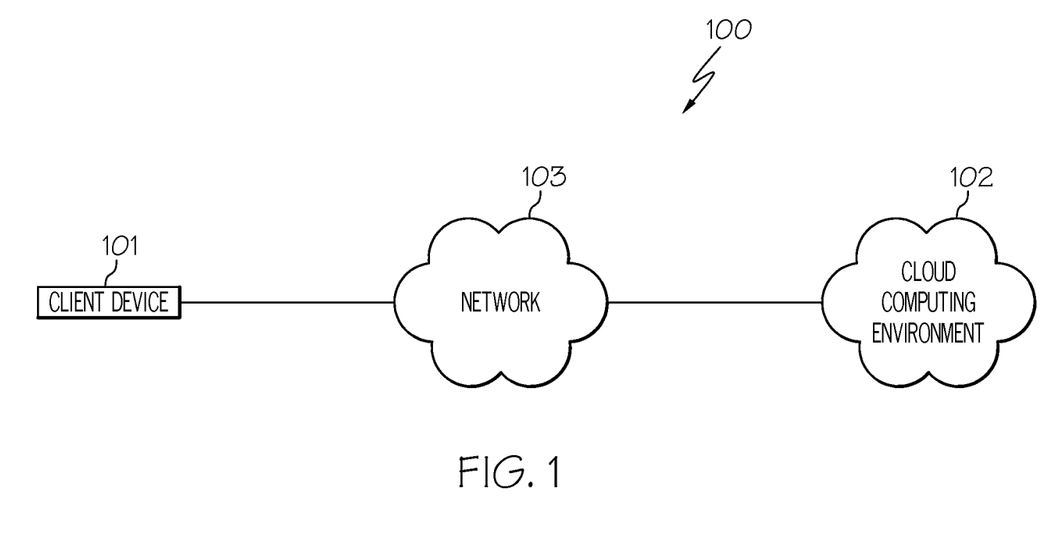
FIG. 1 illustrates a network system configured in accordance with an embodiment of the present invention.

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, personal digital assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
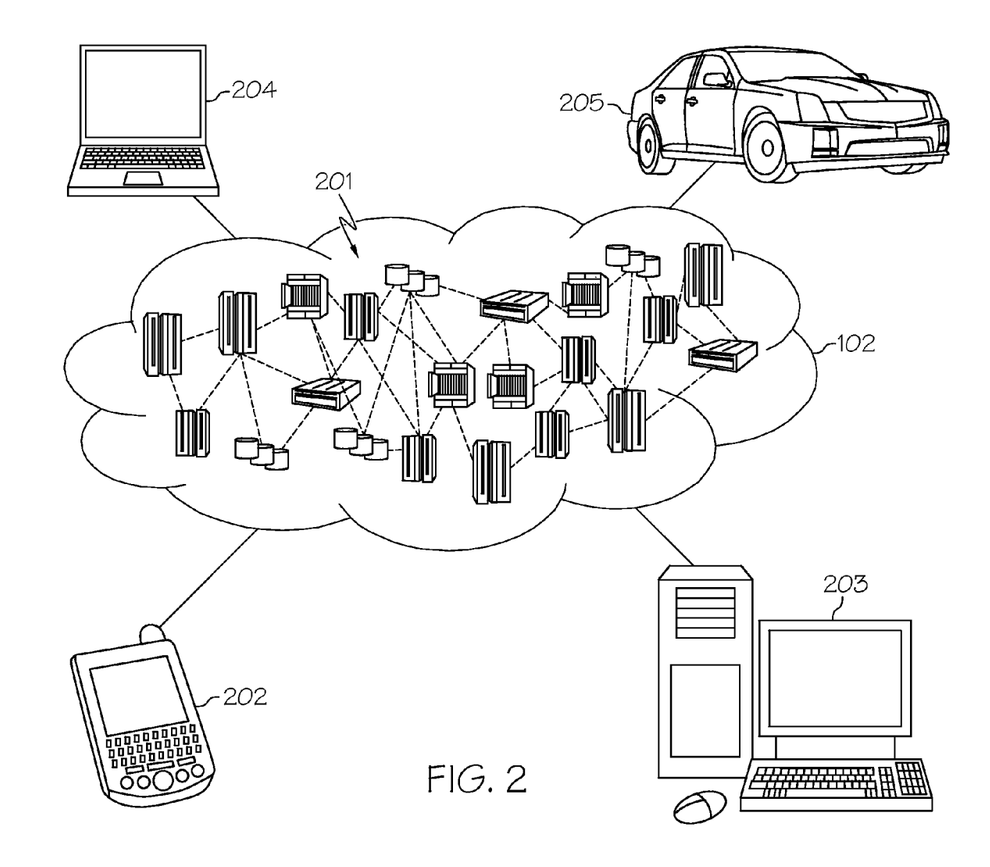
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 with which local computing devices used by cloud consumers, such as, for example, personal digital assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. Cloud computing nodes 201 may include one or more racks of compute nodes (e.g., servers) that are managed by a server (referred to herein as the "administrative server") in cloud computing environment 102 as discussed below in greater detail in connection with FIG. 3.

It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing nodes 201 may store program code on a computer readable storage medium on the server computer. The server computer may download the program code to computing device 202, 203, 204, 205 for use on the computing device.

Figure 3:
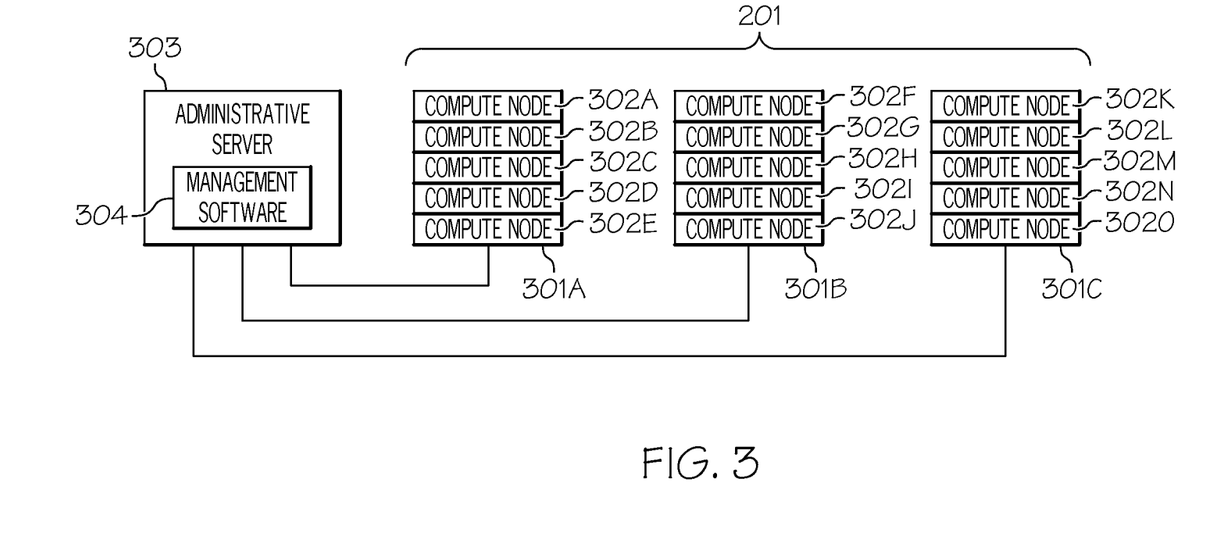
FIG. 3 illustrates a schematic of racks of compute nodes of the cloud computing node(s) that are managed by an administrative server in accordance with an embodiment of the present invention.

Referring now to FIG. 3, FIG. 3 illustrates a schematic of racks of compute nodes (e.g., servers) of cloud computing node(s) 201 that are managed by an administrative server in accordance with an embodiment of the present invention.

As shown, cloud computing node(s) 201 (also may be referred to as a "cluster") may include one or more racks 301A-301C of hardware components or "compute nodes," such as servers or other electronic devices. For example, rack 301A houses compute nodes 302A-302E, rack 301B houses compute nodes 302F-302J and rack 301C houses compute nodes 302K-302O. Racks 301A-301C may collectively be referred to as racks 301 or rack 301, respectively. Furthermore, compute nodes 302A-302O may collectively be referred to as compute nodes 302 or compute node 302, respectively. An illustrative virtualization environment for compute node 302 is discussed further below in connection with FIG. 4. FIG. 3 is not to be limited in scope to the number of racks 301 or compute nodes 302 depicted. For example, cloud computing node 201 may be comprised of any number of racks 301 which may house any number of compute nodes 302. Furthermore, while FIG. 3 illustrates racks 301 housing compute nodes 302, racks 301 may house any type of computing component that is used by cloud computing node 201. Furthermore, while the following discusses compute nodes 302 being confined in designated racks 301, it is noted for clarity that compute nodes 302 may be distributed across cloud computing environment 102 (FIGS. 1 and 2).

As further shown in FIG. 3, racks 301 are each coupled to an administrative server 303 configured to provide data center-level functions. Administrative server 303 supports a module, referred to herein as the management software 304, that can be used to manage all the compute nodes 302 of cloud computing nodes 201, monitor system utilization, intelligently deploy images of data and optimize the operations of cloud computing environment 102. Furthermore, management software 304 can be used to dynamically quantify a demand for software components deployed in cloud computing environment 102 as discussed further below in connection with FIGS. 6-9. A description of the hardware configuration of administrative server 303 is provided further below in connection with FIG. 5.

Figure 4:
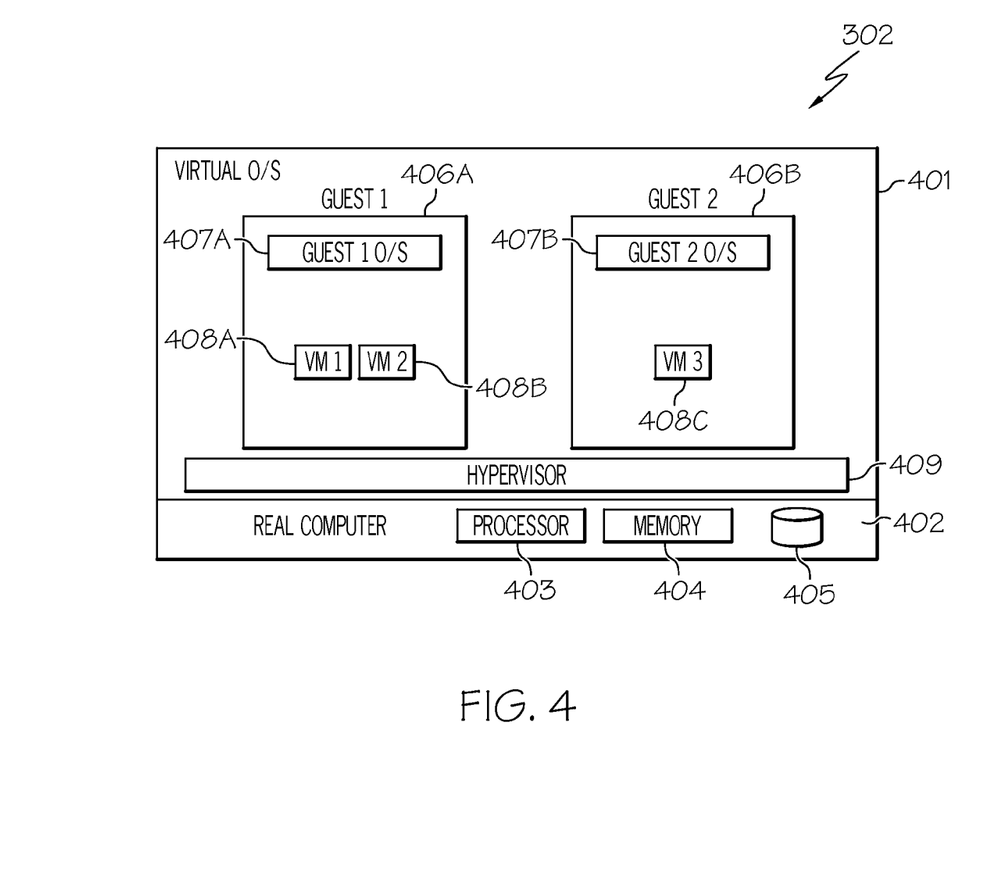
FIG. 4 illustrates a virtualization environment for a compute node in accordance with an embodiment of the present invention.

Referring now to FIG. 4, FIG. 4 illustrates a virtualization environment for compute node 302 (FIG. 3) in accordance with an embodiment of the present invention. Compute node 302 includes a virtual operating system 401. Operating system 401 executes on a real or physical computer 402. Real computer 402 includes one or more processors 403, a memory 404 (also referred to herein as the host physical memory), one or more disk drives 405 and the like. Other components of real computer 402 are not discussed herein for the sake of brevity.

Virtual operating system 401 further includes user portions 406A-406B (identified as "Guest 1" and "Guest 2," respectively, in FIG. 4), referred to herein as "guests." Each guest 406A, 406B is capable of functioning as a separate system. That is, each guest 406A-406B can be independently reset, host a guest operating system 407A-407B, respectively, (identified as "Guest 1 O/S" and "Guest 2 O/S," respectively, in FIG. 4) and operate with different programs. An operating system or application program running in guest 406A, 406B appears to have access to a full and complete system, but in reality, only a portion of it is available. Guests 406A-406B may collectively or individually be referred to as guests 406 or guest 406, respectively. Guest operating systems 407A-

407B may collectively or individually be referred to as guest operating systems 407 or guest operating system 407, respectively.

Each guest operating system 407A, 407B may host one or more virtual machine applications 408A-408C (identified as "VM 1," "VM 2" and "VM 3," respectively, in FIG. 4), such as Java™ virtual machines. For example, guest operating system 407A hosts virtual machine applications 408A-408B. Guest operating system 407B hosts virtual machine application 408C. Virtual machines 408A-408C may collectively or individually be referred to as virtual machines 408 or virtual machine 408, respectively.

Virtual operating system 401 further includes a common base portion 409, referred to herein as a hypervisor. Hypervisor 409 may be implemented in microcode running on processor 403 or it may be implemented in software as part of virtual operating system 401. Hypervisor 409 is configured to manage and enable guests 406 to run on a single host.

As discussed above, virtual operating system 401 and its components execute on physical or real computer 402. These software components may be loaded into memory 404 for execution by processor 403.

The virtualization environment for compute node 302 is not to be limited in scope to the elements depicted in FIG. 4. The virtualization environment for compute node 302 may include other components that were not discussed herein for the sake of brevity.

Figure 5:
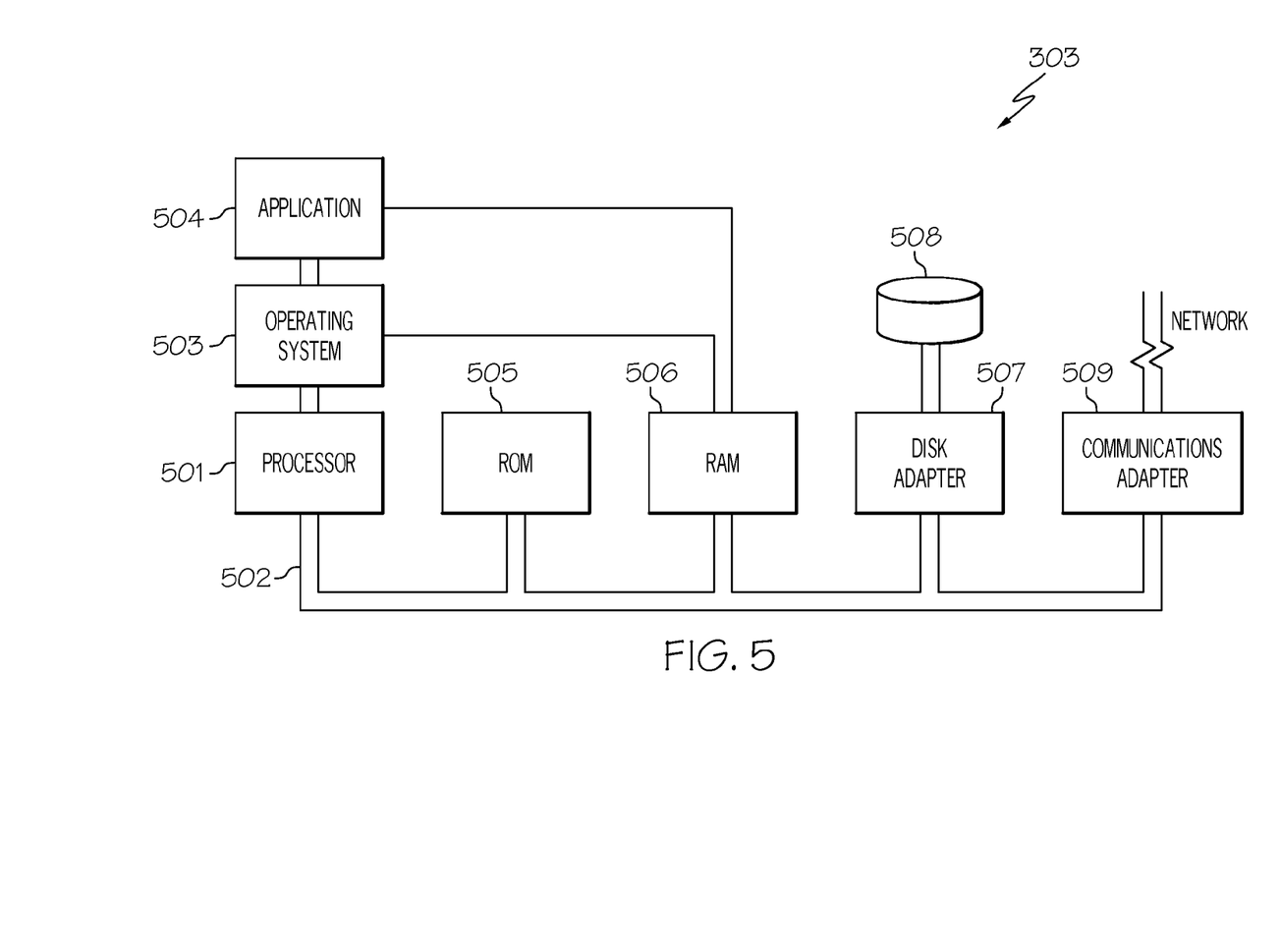
FIG. 5 illustrates a hardware configuration of an administrative server configured in accordance with an embodiment of the present invention.

Referring now to FIG. 5, FIG. 5 illustrates a hardware configuration of administrative server 303 (FIG. 3) which is representative of a hardware environment for practicing the present invention. Administrative server 303 has a processor 501 coupled to various other components by system bus 502. An operating system 503 runs on processor 501 and provides control and coordinates the functions of the various components of FIG. 5. An application 504 in accordance with the principles of the present invention runs in conjunction with operating system 503 and provides calls to operating system 503 where the calls implement the various functions or services to be performed by application 504. Application 504 may include, for example, a program for dynamically quantifying a demand for software components deployed in cloud computing environment 102 (FIGS. 1 and 2) as discussed further below in association with FIGS. 6-9.

Referring again to FIG. 5, read-only memory ("ROM") 505 is coupled to system bus 502 and includes a basic input/output system ("BIOS") that controls certain basic functions of administrative server 303. Random access memory ("RAM") 506 and disk adapter 507 are also coupled to system bus 502. It should be noted that software components including operating system 503 and application 504 may be loaded into RAM 506, which may be administrative server's 303 main memory for execution. Disk adapter 507 may be an integrated drive electronics ("IDE") adapter that communicates with a disk unit 508, e.g., disk drive. It is noted that the program for dynamically quantifying a demand for software components deployed in cloud computing environment 102 (FIGS. 1 and 2), as discussed further below in association with FIGS. 6-9, may reside in disk unit 508 or in application 504.

Administrative server 303 may further include a communications adapter 509 coupled to bus 502. Communications adapter 509 interconnects bus 502 with an outside network (e.g., network 103 of FIG. 1).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, software stacks can be deployed, such as in the cloud environment, using a list of software definitions or an image. Multiple instances of each these software stacks may be deployed in the cloud environment, including the various software components (e.g., operating system, middleware and other applications) that comprise the software stacks. Some of these software components (e.g., Red Hat Enterprise Linux® 6.1 operating system) may be used in multiple software stacks. If the cloud administrator knew which software components in the deployed software stacks were most popular (i.e., have the highest demand) at a given moment in time, then the cloud administrator may be able to make those resources more readily available at that time thereby more efficiently using the resources of the cloud environment. However, it is currently very difficult for the cloud administrator to quantify which software components of the software stacks deployed in the cloud environment are in the highest demand since the number of deployed software stacks is large and users are constantly adding and removing workloads from the cloud environment. As a result, cloud administrators cannot currently allocate resources of the cloud environment efficiently to meet changes in user demands as priorities change.

Figure 6:
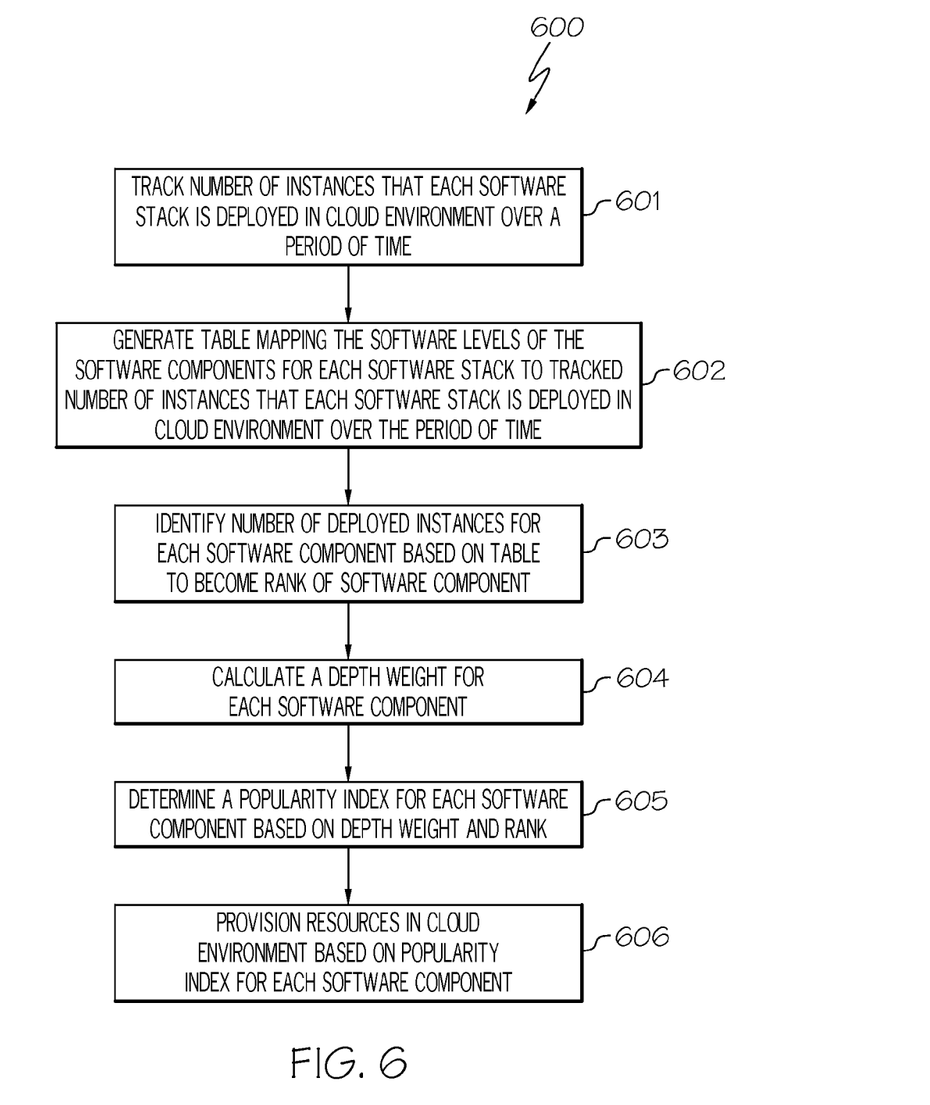
FIG. 6 is a flowchart of a method for dynamically quantifying a demand for software components deployed in a cloud computing environment in accordance with an embodiment of the present invention.
Figure 7:
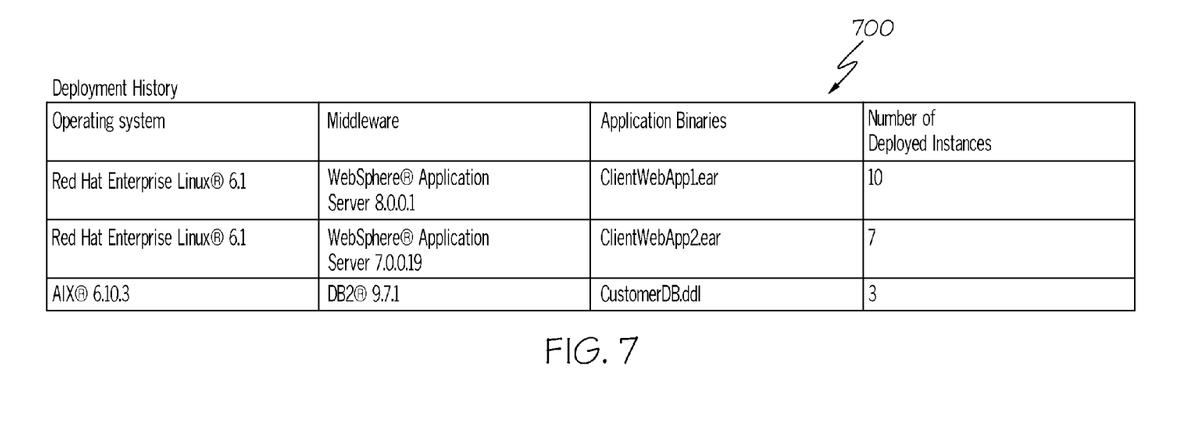
FIG. 7 is a table storing the deployment history for the software stacks deployed in the cloud computing environment in accordance with an embodiment of the present invention.
Figure 8:
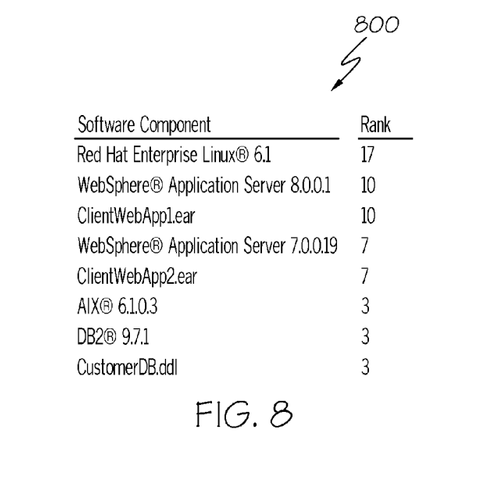
FIG. 8 is a table storing the number of deployed instances for each software component deployed in the cloud computing environment in accordance with an embodiment of the present invention.
Figure 9:
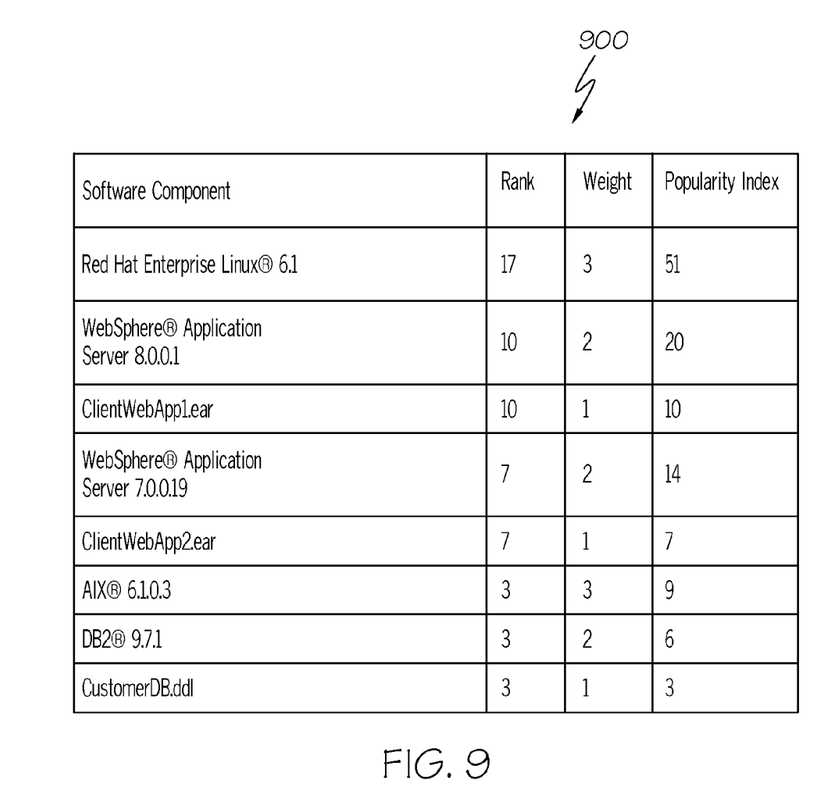
FIG. 9 is a table storing the popularity indices of the software components deployed in the cloud computing environment in accordance with an embodiment of the present invention.

The principles of the present invention provide a means for dynamically quantifying a demand for software components deployed in the cloud environment thereby enabling cloud administrators to more efficiently allocate resources of the cloud environment as discussed further below in connection with FIGS. 6-9. FIG. 6 is a flowchart of a method for dynamically quantifying a demand for software components deployed in cloud computing environment 102 (FIGS. 1 and 2). FIG. 7 is a table storing the deployment history for the software stacks deployed in cloud computing environment 102. FIG. 8 is a table storing the number of deployed instances for each software component deployed in cloud computing environment 102. FIG. 9 is a table storing the popularity indices of the software components deployed in cloud computing environment 102.

Referring now to FIG. 6, FIG. 6 is a flowchart of a method 600 for dynamically quantifying a demand for software components deployed in cloud computing environment 102 (FIGS. 1 and 2) in accordance with an embodiment of the present invention.

Referring to FIG. 6, in conjunction with FIGS. 1-5, in step 601, management software 304 tracks the number of instances that each software stack is deployed in cloud computing environment 102 over a period of time.

In step 602, management software 304 generates a table mapping the software levels of the software components for each software stack deployed in cloud computing environment 102 to the tracked number of instances that each software stack is deployed in cloud computing environment 102 over the period of time (the period of time used in step 601 to track the number of instances that each software stack is deployed in cloud computing environment 102) as illustrated in FIG. 7.

FIG. 7 is a table 700 illustrating a deployment history for the software stacks deployed in cloud computing environment 102 in accordance with an embodiment of the present invention. Referring to FIG. 7, table 700 illustrates the various software levels of the software components for the software stacks deployed in cloud computing environment 102. For example, the software components of operating system, middleware and application binaries (application in binary form) correspond to the software components of the software stacks deployed in cloud computing environment 102. Table 700 further illustrates three software levels (zero-based) for each software stack, namely, the zero level (first column) corresponds to the software component type of operating system, the first level (second column) corresponds to the software component type of middleware, and the second level (third column) corresponds to the software component type of application binaries. Determining the software levels for the software components is used to assign the appropriate weight that should be applied to the ranking of the software component in question in order to determine the appropriate popularity or demand of the software component as discussed further below. While table 700 illustrates three software levels for the deployed software stacks, the principles of the present invention are not limited to any particular number of software levels for the deployed software stacks.

Furthermore, table 700 stores the number of deployed instances for each software stack. For example, table 700 indicates that the software stack comprising the Red Hat Enterprise Linux® 6.1 operating system, the WebSphere® Application Server 8.0.0.1 middleware and the application binaries stored at Client WebApp1.ear has been deployed ten times in cloud computing environment 102 over the period of time used in step 601. Table 700 further indicates the number of times the other software stacks have been deployed in cloud computing environment 102. For example, the software stack comprising the Red Hat Enterprise Linux® 6.1 operating system, the WebSphere® Application Server 7.0.0.19 middleware and the application binaries stored at Client WebApp2.ear has been deployed seven times in cloud computing environment 102 over the period of time used in step 601 and the software stack comprising the AIX® 6.10.3 operating system, the DB2® 9.7.1 middleware and the application binaries stored at CustomerDB.ddl has been deployed three times in cloud computing environment 102. As further illustrated in table 700, various versions of the same application may be used in the deployed software stacks. For example, different versions of WebSphere® are used in the deployment of two different software stacks.

As further illustrated in FIG. 7, some of the software components, such as the Red Hat Enterprise Linux® 6.1 operating system, have been deployed in multiple software stacks. Such information is valuable in determining the total number of times the software component has been deployed in cloud computing environment 102 so as to accurately assess the demand of such a software component as discussed below.

Returning to FIG. 6, in conjunction with FIGS. 1-5 and 7, in step 603, using the information stored in table 700, management software 304 identifies the number of deployed instances for each software component mapped in table 700 to become the "rank" of the software component as illustrated in FIG. 8.

FIG. 8 is a table 800 storing the number of deployed instances for each software component deployed in cloud computing environment 102 in accordance with an embodiment of the present invention. Referring to FIG. 8, FIG. 8 indicates the total number of instances (identified as "rank" in FIG. 8) deployed for each software component in cloud computing environment 102 across the multiple software stacks deployed in cloud computing environment 102. For example, the software component of Red Hat Enterprise Linux® 6.1 operating system has been deployed 17 times in cloud computing environment 102 (deployed ten times for the software stack that includes the components of the Red Hat Enterprise Linux® 6.1 operating system, the WebSphere® Application Server 8.0.0.1 middleware and the application binaries stored at Client WebApp1.ear and deployed seven times for the software stack that includes the components of the Red Hat Enterprise Linux® 6.1 operating system, the WebSphere® Application Server 7.0.0.19 middleware and the application binaries stored at Client WebApp2.ear). While identifying the number of times a software component has been deployed in cloud computing environment 102 provides some indication as to the popularity or demand of the software component, it does not provide an indication as to how widely used the software component can be used in cloud computing environment 102. For example, the WebSphere® middleware application can be more generally used in cloud computing environment 102 than a specific binary application. As a result, a weight (the "depth weight" as discussed further below) should be applied to the "rank" to provide a more useful metric in quantifying the demand for the software component as discussed below.

Returning to FIG. 6, in conjunction with FIGS. 1-5 and 7, in step 604, management software 304 calculates a "depth weight" for each software component mapped in table 700. A depth weight (W) is equal to the following equation (EQ 1):

$$W = Ds - Di, \qquad (EQ\ 1)$$

where Ds corresponds to the depth size and Di corresponds to the depth index (zero-based).

The depth size of a software component refers to the number of software levels for the software stack bearing the software component in question. For example, referring to table 700 of FIG. 7, the depth size for the components Red Hat Enterprise Linux® 6.1 operating system, the WebSphere® Application Server 8.0.0.1 middleware and the application binaries stored at Client WebApp1.ear is three since there are three software levels for the software stack including these components.

The depth index refers to the particular software level of the software component in question. For example, referring to table 700 of FIG. 7, the depth index of the software component Red Hat Enterprise Linux® 6.1 operating system is zero (the depth index is zero-based), the depth index of the software component WebSphere® Application Server 8.0.0.1 middleware is one and the depth index of the application binaries stored at Client WebApp1.ear is two. As a result, the depth weight (W) of Red Hat Enterprise Linux® 6.1 operating system is three (3-0), the depth weight (W) of WebSphere® Application Server 8.0.0.1 is two (3-1) and the depth weight (W) of the application binaries stored at Client WebApp1.ear is one (3-2).

In step 605, management software 304 determines a popularity index for each software component mapped in table 700 based on the depth weight and rank for that software component. The "popularity index" refers to a metric used in quantifying the demand for the software component. In one embodiment, the popularity index (P) is equal to the following equation (EQ 2):

$$P = R*(Ds - Di), \qquad (EQ\ 2)$$

where R corresponds to the "rank" or number of deployed instances for that software component mapped in table 700 as illustrated in table 800 of FIG. 8.

Using the information stored in tables 700, 800 of FIGS. 7 and 8, respectively, management software 304 determines the popularity index for each software component mapped in table 700 using equation (EQ2) and stores the calculated popularity indices in table 900 of FIG. 9.

FIG. 9 is a table 900 storing the popularity indices of the software components deployed in cloud computing environment 102 in accordance with an embodiment of the present invention. Referring to FIG. 9, table 900 stores the rank, depth weight (indicated as "weight" in FIG. 9) and popularity index for each software component deployed in cloud computing environment 102. For example, the software component Red Hat Enterprise Linux® 6.1 operating system has a rank of 17 (deployed 17 times in cloud computing environment as shown in table 800), a depth weight (W) of three and a popularity index of 51, which is equal to the rank*depth weight (17*3).

As illustrated in table 900, the software component Red Hat Enterprise Linux® 6.1 operating system has the highest popularity index (greatest demand) followed by the WebSphere® Application Server 8.0.0.1 (popularity index of 20) and the WebSphere® Application Server 7.0.0.19 (popularity index of 14). By developing a metric (popularity index) to quantify the demand of a software component, the cloud administrator will be better able to more efficiently allocate resources of cloud computing environment 102. For example, the cloud administrator may make the resource of the Red Hat Enterprise Linux® 6.1 operating system more readily available due to its high popularity index.

Returning to FIG. 6, in conjunction with FIGS. 1-5 and 7-9, in step 606, management software 304 provisions the resources in cloud computing environment 102 based on the popularity index stored in table 900 for each software component mapped in table 700. In this manner, resources can be more efficiently allocated in cloud computing environment 102.

In some implementations, method 600 may include other and/or additional steps that, for clarity, are not depicted. Further, in some implementations, method 600 may be executed in a different order presented and that the order presented in the discussion of FIG. 6 is illustrative. Additionally, in some implementations, certain steps in method 600 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for dynamically quantifying a demand for software components deployed in a cloud environment, the method comprising:
    tracking a number of instances that each of a plurality of software stacks is deployed in said cloud environment over a period of time;
    generating a table mapping software levels of software components for each of said plurality of software stacks to said tracked number of instances that each of said plurality of software stacks is deployed in said cloud environment over said period of time;
    identifying a number of deployed instances for each of said software components based on said table;
    calculating a weight for each of said software components; and
    determining, by processor, a popularity index for each of said software components based on said number of deployed instances and said weight.

2. The method as recited in claim 1 further comprising:
    provisioning resources in said cloud environment based on said popularity index for each of said software components.

3. The method as recited in claim 1, wherein said weight is based on subtracting a depth index from a depth size, wherein said depth index corresponds to a software level, wherein said depth size corresponds to a number of software levels of an associated software stack.

4. The method as recited in claim 3, wherein said popularity index for a software component is equal to the equation:

$$P=R*(Ds-Di);$$

wherein said P is said popularity index for said software component, wherein said R is a number of deployed instances for said software component, wherein said Ds is said depth size of a software stack including said software component, and wherein said Di is said depth index for said software component.

5. The method as recited in claim 3, wherein each of said software components of each of said plurality of software stacks comprises a type of one of the following: an operating system, a middleware application and application binaries.

6. The method as recited in claim 5, wherein said weight of said operating system is higher than said weight of said middleware application, wherein said weight of said middleware application is higher than said weight of said application binaries.

7. The method as recited in claim 1, wherein said number of deployed instances for each of said software components is identified across said plurality of software stacks deployed in said cloud environment over said period of time.

8. A computer program product embodied in a computer readable storage medium for dynamically quantifying a demand for software components deployed in a cloud environment, the computer program product comprising the programming instructions for:
    tracking a number of instances that each of a plurality of software stacks is deployed in said cloud environment over a period of time;
    generating a table mapping software levels of software components for each of said plurality of software stacks to said tracked number of instances that each of said plurality of software stacks is deployed in said cloud environment over said period of time;
    identifying a number of deployed instances for each of said software components based on said table;
    calculating a weight for each of said software components; and
    determining a popularity index for each of said software components based on said number of deployed instances and said weight.

9. The computer program product as recited in claim 8 further comprising the programming instructions for:
    provisioning resources in said cloud environment based on said popularity index for each of said software components.

10. The computer program product as recited in claim 8, wherein said weight is based on subtracting a depth index from a depth size, wherein said depth index corresponds to a software level, wherein said depth size corresponds to a number of software levels of an associated software stack.

11. The computer program product as recited in claim 10, wherein said popularity index for a software component mapped in said table is equal to the equation:

$$P=R*(Ds-Di);$$

wherein said P is said popularity index for said software component, wherein said R is a number of deployed instances for said software component, wherein said Ds is said depth size of a software stack including said software component, and wherein said Di is said depth index for said software component.

12. The computer program product as recited in claim 10, wherein each of said software components of each of said plurality of software stacks comprises a type of one of the following: an operating system, a middleware application and application binaries.

13. The computer program product as recited in claim 12, wherein said weight of said operating system is higher than said weight of said middleware application, wherein said weight of said middleware application is higher than said weight of said application binaries.

14. The computer program product as recited in claim 8, wherein said number of deployed instances for each of said software components mapped in said table is identified across said plurality of software stacks deployed in said cloud environment over said period of time.

15. A system, comprising:
    a memory unit for storing a computer program for dynamically quantifying a demand for software components deployed in a cloud environment; and
    a processor coupled to said memory unit, wherein said processor, responsive to said computer program, comprises:
        circuitry for tracking a number of instances that each of a plurality of software stacks is deployed in said cloud environment over a period of time;
        circuitry for generating a table mapping software levels of software components for each of said plurality of software stacks to said tracked number of instances that each of said plurality of software stacks is deployed in said cloud environment over said period of time;
        circuitry for identifying a number of deployed instances for each of said software components based on said table;
        circuitry for calculating a weight for each of said software components; and circuitry for determining a popularity index for each of said software components based on said number of deployed instances and said weight.

16. The system as recited in claim 15, wherein said processor further comprises:

circuitry for provisioning resources in said cloud environment based on said popularity index for each of said software components.

17. The system as recited in claim 15, wherein said weight is based on subtracting a depth index from a depth size, wherein said depth index corresponds to a software level, wherein said depth size corresponds to a number of software levels of an associated software stack.

18. The system as recited in claim 17, wherein said popularity index for a software component mapped in said table is equal to the equation:

$$P=R*(Ds-Di);$$

wherein said P is said popularity index for said software component, wherein said R is a number of deployed instances for said software component, wherein said Ds is said depth size of a software stack including said software component, and wherein said Di is said depth index for said software component.

19. The system as recited in claim 17, wherein each of said software components of each of said plurality of software stacks comprises a type of one of the following: an operating system, a middleware application and application binaries.

20. The system as recited in claim 19, wherein said weight of said operating system is higher than said weight of said middleware application, wherein said weight of said middleware application is higher than said weight of said application binaries.

* * * * *